United States Patent Office 3,637,661
Patented Jan. 25, 1972

3,637,661
10-HYDROXY-10,11-DIHYDRO-DIBENZAZEPINE DERIVATIVE
Walter Schindler, Riehen, Switzerland, assignor to Ciba-Geigy Corporation, Ardsley, N.Y.
No Drawing. Filed Mar. 4, 1970, Ser. No. 16,551
Int. Cl. C07d 41/08
U.S. Cl. 260—239 D                                 1 Claim

ABSTRACT OF THE DISCLOSURE

10 - hydroxy - 10,11 - dihydro-5H - dibenz[b,f]azepine-5-carboxamide has a depressant effect on the central nervous system; the compound is the active ingredient of pharmaceutical compositions and is useful for the treatment of psychosomatic disturbances, of epilepsy and of trigeminal neuralgia.

DETAILED DESCRIPTION

The present invention relates to a new azepine derivative, to a process for the production thereof to medicaments containing the new compound and to the use thereof.

More particularly, the present invention relates to 10-hydroxy - 10,11 - dihydro - 5H - dibenz[b,f]azepine - 5-carboxamide of Formula I

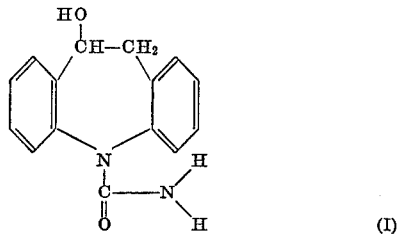

(I)

which compound has been found to possess valuable pharmacological properties and a particularly high therapeutic index. In the case of oral or rectal administration the compound has a central nervous system depressant action, as can be shown, in various pharmacological tests.

Upon administration of about 4.3 to about 200 mg./kg. it exhibits an anticonvulsive action, relaxes the central muscular system and inhibits the fighting reaction of mice. These properties, which are determined by selected standard tests [cp. R. Domenjoz and W. Theobald, Arch. Int. Pharmacodyn. 120, 450 (1959) and W. Theobald et al., Arzneimittel-Forsch. 17, 561 (1967)], characterize the compound as being suitable for the treatment of psychosomtic disturbances, epilepsy, trigeminal neuralgia and cerebral spasticity in mammals.

The compound of Formula I is produced, according to the invention, by reducing 10-oxo-10,11-dihydro-5H-dibenz[b,f]azepine-5-carboxamide of Formula II.

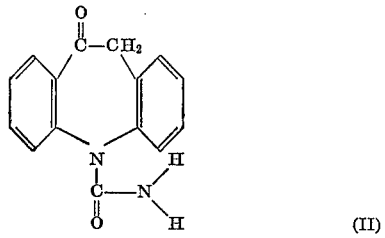

(II)

The reduction of the oxo- to the corresponding hydroxy compound of Formula I can be performed with hydrogen in the presence of a catalyst, especially in the presence of copper chromite. The catalytic hydrogenation is preferably carried out in a solvent. Suitable solvents are, e.g. ethereal liquids such as dioxane, diethylene glycol dimethyl ether or diethylene glycol diethyl ether.

The starting material of Formula II, the 10-oxo-10,11-dihydro-5H-dibenz[b,f]azepine - 5 - carboxamide, is produced, for example, starting with 10-methoxy-5H-dibenz[b,f]azepine (cp. J. R. Geigy A. G., Belgian Pat. No. 597.793), as follows: The stated enol ether is reacted with phosgene in toluene to the 10-methoxy-5H-dibenz[b,f]azepine-5-carbonyl chloride, which, in ethanol with ammonia, yields the 10-methoxy-5H-dibenz[b,f]azepine-5-carboxamide; this enol ether is converted by boiling with dilute hydrochloric acid into the ketone.

As mentioned above, the new active substance is administered orally or rectally. The dosage depends on the manner of administration, the species, the age, and on the individual condition. In general the daily dosage of active substance varies between about 3 mg./kg. and about 20 mg./kg. for mammals. Suitable dosage units such as dragées, tablets or suppositories, preferably contain 30–200 mg. of an active substance according to the invention.

Dosage units for oral administration preferably contain, as active substance, between 10 and 90% of the compound of Formula I. They are produced by combining the active substance with, e.g. solid pulverulent carriers such as lactose, saccharose, sorbitol, mannitol; starches such as potato starch, maize starch or amylopectin, also laminaria powder or citrus pulp powder; cellulose derivatives or gelatine, optionally with the addition of lubricants such as magnesium stearate or polyethylene glycols, to form tablets or dragée cores. The dragée cores are coated, e.g. with concentrated sugar solutions which can also contain, e.g. gum arabic, talcum and/or titanium dioxide, or with a lacquer dissolved in easily volatile organic solvents or in mixtures of solvents. Dyestuffs can be added to these coatings, e.g. to distinguish between varying dosages of active substance.

Other suitable dosage units for oral administration are hard gelatine capsules as well as soft closed capsules made from gelatine and a softener, such as glycerol. The hard capsules preferably contain the active substance as a granulate, e.g. in admixture with fillers such as maize starch, and/or lubricants such as talcum or magnesium stearate, and, optionally, with stabilizers such as sodium metabisulphite ($Na_2S_2O_5$) or ascorbic acid. In soft capsules, the active substance is preferably dissolved or suspended in suitable liquids such as liquid polyethylene glycols, whereby stabilizers can also be added.

Suitable dosage units for rectal administration are, e.g. suppositories consisting of a combination of an active substance with a suppository foundation substance. Suitable as suppository foundation substances are, e.g. natural or synthetic triglycerides, paraffin hydrocarbons, polyethylene glycols or higher alkanols. Also suitable are gelatine rectal capsules consisting of a combination of the active substance and a foundation substance. Suitable as a foundation substance are, e.g. liquid triglycerides, polyethylene glycols or paraffin hydrocarbons.

The following examples will serve to further illustrate the production of the new compound of Formula I. The temperatures are given in degrees centigrade.

EXAMPLE 1

(a) 30 g. of 10-oxo-10,11-dihydro-5H-dibenz[b,f]azepine-5-carboxamide are hydrogenated in 250 ml. of abs. dioxane, in the presence of 5 g. of copper chromite catalyst, with hydrogen at 100–110° and under 150 atmospheres in an autoclave for 6.5 hours until the absorption of hydrogen ceases. After completion of the reaction, the catalyst is separated by filtration, and the solvent distilled off under a water-jet vacuum. The residue is crystallized from ethanol, to give 10-hydroxy-10,11-dihydro-5H-dibenz[b,f]azepine-5-carboxamide, M.P. 195–196°.

The starting product, the 10-oxo-10,11-dihydro-5H-dibenz[b,f]azepine-5-carboxamide, is produced as follows:

(b) 223 g. of 10-methoxy-5H-dibenz[b,f]azepine (c.p. J. R. Geigy A.G., Belgian Pat. No. 597,793) are heated in 1.500 ml. of abs. toluene, whilst being stirred, to 30°. A vigorous stream of phosgene is then introduced into the reaction mixture. The internal temperature is raised in the course of 3 hours to 95° and the reaction mixture is then held for one hour at this temperature. The supply of phosgene is then interrupted, the source of heat removed and the excess of phosgene blown out with dry nitrogen. The precipitated reaction product is afterwards filtered under suction. The filtrate is concentrated by evaporation under a water-jet vacuum and the residue crystallized from ethanol. A further amount of the reaction product is obtained, which, together with the first fraction is recrystallized from ethanol to give the 10-methoxy-5H-dibenz[b,f]azepine-5-carbonyl chloride, M.P. 138°.

(c) 215 g. of the carbonyl chloride, produced according to (b), are refluxed in 2.000 ml. of ethanol. Anhydrous ammonia is introduced for 4 hours, whilst stirring, into the boiling solution. The reaction mixture is subsequently cooled to room temperature, and is then poured into 5.000 ml. of water. The precipitated crystals are filtered under suction and washed with water. The moist crude product is recrystallized from ethanol, whereupon the 10-methoxy-5H-dibenz[b,f]azepine - 5 - carboxamide, M.P. 181°, is obtained.

(d) 65 g. of the carboxamide, obtained according to (c), are refluxed with 650 ml. of 2 N hydrochloric acid for 2 hours. After cooling, the reaction product is filtered under suction. After recrystallization from ethanol, is obtained the 10-oxo-10,11-dihydro-5H-dibenz[b,f]azepine-carboxamide, M.P. 215–216°.

The following prescriptions further illustrate the production of tablets, dragées, capsules and suppositories:

EXAMPLE 2

500 g. of 10-hydroxy-10,11-dihydro-5H-dibenz[b,f]azepine-5-carboxamide are mixed with 550.0 g. of lactose and 292.0 g. of potato starch. The mixture is then moistened with an alcoholic solution of 8.0 g. of gelatine, granulated through a sieve and dried. 60.0 g. of potato starch, 60.0 g. of talcum, 10.0 g. of magnesium stearate and 20.0 g. of highly dispersed silicon dioxide are mixed in and the mixture is pressed into 10,000 tablets each weighing 150 mg. and each containing 50 mg. of active substance. Optionally, the tablets can be provided with grooves for more precise adjustment of the dosage amount.

EXAMPLE 3

A granulate is produced from 1.000 g. of 10-hydroxy-10,11 - dihydro-5H-dibenz[b,f]azepine - 5 - carboxamide, 379.0 g. of lactose and the aqueous solution of 6.0 g. of gelatine. After being dried, the granulate is mixed with 10.0 g. of colloidal silicon dioxide, 40.0 g. of talcum, 60.0 g. of potato starch and 5.0 g. of magnesium stearate and the mixture is pressed into 10.000 dragée cores. These are afterwards coated with a concentrated syrup made from 533.5 g. of crystallized saccharose, 20.0 g. of shellac, 75.0 g. of gum arabic, 250.0 g. of talcum, 20.0 g. of colloidal silicon dioxide and 1.5 g. of dyestuff, and then dried. The obtained dragées each weigh 240 mg. and each contain 100 mg. of active substance.

EXAMPLE 4

To produce 1.000 capsules, each containing 75 mg. of active substance, 75.0 g. of 10-hydroxy-10,11-dihydro-5H-dibenz[b,f]azepine-5-carboxamide are mixed with 198.0 g. of lactose. The mixture is evenly moistened with an aqueous solution of 2.0 g. of gelatine and is then granulated through a suitable sieve (e.g. sieve III according to Ph. Helv. V). The granulate is mixed with 10.0 g. of dried maize starch and 15.0 g. of talcum and the mixture is uniformly filled into 1.000 hard gelatine capsules, size 1.

EXAMPLE 5

A suppository foundation mixture is prepared from 10.0 g. of 10-hydroxy-10,11-dihydro-5H-dibenz[b,f]azepine-5-carboxamide and 158.5 g. of adeps solidus, and from this mixture are filled 100 suppositories each containing 100 mg. of active substance.

What is claimed is:

1. 10-hydroxy - 10,11 - dihydro-dibenz[b,f]azepine carboxamide.

References Cited

FOREIGN PATENTS 403,767    6/1966    Switzerland _____ 260—239

ALTON D. ROLLINS, Primary Examiner

U.S. Cl. X.R.

424—244